United States Patent [19]

Kiss et al.

[11] 4,132,910
[45] Jan. 2, 1979

[54] LINEARLY MOVING OR ROTATED FLAT ARMATURE FOR MOTOR AND PULLING MAGNETS

[75] Inventors: László Kiss; László Csillag; Károly Halmai; László Miskolczi, all of Budapest, Hungary

[73] Assignee: Muanyagipari Kutato Intezet, Budapest, Hungary

[21] Appl. No.: 740,861

[22] Filed: Nov. 11, 1976

[51] Int. Cl.² .................... H02K 41/02; H02K 1/22
[52] U.S. Cl. .......................... 310/12; 310/13; 310/44; 310/268
[58] Field of Search ................ 310/12, 13, 44, 268

[56] References Cited

U.S. PATENT DOCUMENTS

| | | | |
|---|---|---|---|
| 2,201,699 | 5/1940 | Myers | 310/44 |
| 3,136,934 | 6/1964 | Henry-Buddot | 310/12 |
| 3,668,585 | 6/1972 | Johnson | 310/44 |
| 3,872,334 | 3/1975 | Loubier | 310/44 |
| 3,891,879 | 6/1975 | Yamada et al. | 310/44 |

Primary Examiner—Benjamin R. Padgett
Assistant Examiner—Irwin Gluck
Attorney, Agent, or Firm—Young & Thompson

[57] ABSTRACT

The invention relates to a linearly moving or rotated flat armature for motors and pulling magnets, comprising a carrier of plastics or of ceramics and a coil system placed on this carrier. The flat armature according to the invention has a carrier which contains 2 to 50% by weight of a mild magnetic substance distributed therein homogeneously.

The flat armature according to the invention makes possible an increase of the efficiency of the motor or of the pulling magnet at identical dimensions.

5 Claims, 1 Drawing Figure

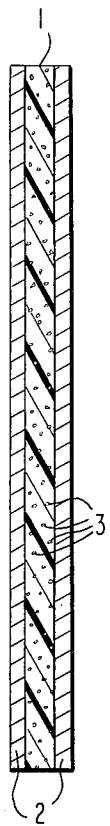

LINEARLY MOVING OR ROTATED FLAT ARMATURE FOR MOTOR AND PULLING MAGNETS

The invention relates to a linearly moving or rotated flat armature for motors and pulling magnets, comprising a carrier of plastics or of ceramics and of a coil system placed on this carrier.

Devices consisting of a stator of permanent magnets and of a rotor armature with printed coil arrangement and operated by d.c. or by impulses are known to be applied in the various steering systems in a wide field. These devices possess the advantage of being capable to be operated quicker than the conventional devices containing iron, due to the small mass of the rotor. In addition to that, the d.c. steering or another steering analogous to it is very favourable from the aspect of the starting movement. Firms producing motors and steering equipment are engaged throughout the world in the improvement of the efficiency of equipments of this type.

Various processes were developed for the improvement of the magnetic systems and within these systems for the increase of the air-gap induction, and for the arrangement of the coils and for the production of the rotor. The output of the motors can be impoved also by a suitable arrangement of the magnets, by raising the air-gap induction.

The coil system can be produced by the conventional printed circuit technique e.g. in the case of motors with undulated coiling by a suitable overcontacting or by the welded contacting of conductor pieces compressed from electric conductor sheets to suitable shapes. Also the coil systems of electromechanical pulling magnets and servomotors equipped with flat armature moving linearly can be developed by a similar technique.

According to literature dealing with the construction and theoretical problems of motors having a disc-shaped armature the rotor cannot be produced from a ferromagnetic substance because this would increase the mass and inductivity of the rotor, and also the eddy current loss. The quick operation of the equipment and the steady movement of the rotor are inhibited by these factors.

The aim of the invention is the development of a plastics or ceramics carrier with magnetic properties for the rotor of motors and pulling magnets having flat armature which carrier makes possible the rise of the output under identical dimensions.

The invention is based on the recognition that the parameters of the equipment are significantly improved by applying a magnetic insulator plastics as carrier of the armature of the motors of pulling magnets having a flat armature. This recognition is surprising since the literature dealing with the theory of motors having flat armature unequivocally excludes the possibility of producing rotor carriers from ferromagnetic substances, claiming that, on the one hand, eddy current losses are increased by the use of ferromagnetic substances and, on the other hand, owing to the impact of the rotor, inequalities of the moment occur (Engineers' Digest 30, 5 /1969/; Electronics 40, 124 /1967/). Thus, the invention results in overcoming a technical prejudice since no eddy currents are created in the equipment according to the invention and no inequalities of the moment are observed.

Accordingly, the invention relates to a linearly moving or rotated flat armature for motors and pulling magnets, comprising a carrier of plastics or ceramics, and a coil system placed on this carrier. A new feature of the flat armature according to the invention is that its carrier contains 2 to 50% by weight, preferably 10 to 18% by weight, of a mild magnetic material in homogeneous distribution.

Mild magnetic materials are characterized by their relatively high permeability ($\mu$ = 10,000–100,000) and low coercive force (0.015–1 Oe).

The flat armature according to the invention contains as mild magnetic material preferably a mild magnetic alloy, mild iron or mild ferrite.

Expediently iron alloys containing nickel, molybdenum, chromium or silicon, e.g. permalloy type alloys, can be used as mild magnetic alloys.

As mild iron expediently powdered iron of a grain size of 3 to 200 microns prepared from iron pentacarbonyl (Fe/CO/$_5$) can be used.

As a mild ferrite, expediently $NiO.Fe_2O_3$, $NiO.ZnO.Fe_2O_3$, $MnO.Fe_2O_3$, $MnO.ZnO.Fe_2O_3$, $Cu_2O.Fe_2O_3$, $CuO.2Fe_2O_3$, $CuO.ZnO.Fe_2O_3$, $Li_2O.ZnO.Fe_2O_3$, $MgO.Fe_2O_3$, $CoO.Fe_2O_3$, $CoO.ZnO.Fe_2O_3$, $CoO.NiO.Fe_2O_3$, $CoO.NiO.ZnO.Fe_2O_3$ or $MnO.MgO.Fe_2O_3$ of an average grain size of 50 to 200 microns can be used.

The plastics carrier of the flat armature according to the invention can be produced in various ways. One can expediently.

(a) melt a thermoplastic synthetic resin of a softening point of at least 150° C., then disperse in the melt 10 to 50% by weight, preferably 20% by weight, of a mild magnetic substance, and process the mixture obtained in this way to a carrier body of the desired shape and size, or (b) disperse in an unsaturated polyester resin or not cross-linked epoxy resin 10 to 50% by weight, preferably 22% by weight, of a mild magnetic substance, then cross-link the obtained mixture to a degree of cross-linkage of 50 to 80%, grind the obtained product and process the formed press powder to carrier bodies of the desired shape and size, or (c) disperse 10 to 50% by weight, preferably 15 to 20% by weight, of a mild magnetic substance in an A-phase thermoplastic resin of polycondensation type, convert the obtained mixture into a material of B-phase, and process the press powder obtained by grinding from the product of B-phase into a carrier body of the desired shape and size, or (d) mix up a thermoplastic resin press powder of B-phase polycondensation type with 10 to 50% by weight, preferably 16 to 20% by weight, of a mild magnetic substance, and convert the obtained mixture into a carrier body of the desired shape and size, or (e) homogenize powdered polytetrafluoroethylene with 10 to 50% by weight, preferably 18 to 22% by weight, of a mild magnetic substance, process the obtained mixture to carrier bodies of the desired shape and size, and sinter the produced carrier bodies.

The main advantages of the flat armatures according to the invention are as follows:

1. The air gap induction and also the efficiency of the equipment are raised.
2. The external dimensions can be further decreased while maintaining the same efficiency.
3. The creation of eddy currents is prevented by the introduction of the ferromagnetic substance in a homogeneous distribution into the carrier.

The accompanying drawing shows, in greatly enlarged cross section, a flat armature according to the invention.

In the drawing, the carrier of plastics or ceramics is shown in the form of a flat sheet 1; while the coil system on opposite sides of the sheet 1 is shown at 2, comprising thin copper coatings or foils with coil systems applied by any method usual in this art. The particles of mild magnetic substance are shown at 3.

The flat armature according to the invention and the ways of its production are shown in detail by the following non-limiting Examples. The relative permeability of the produced armature sheets was determined on the basis of the magnetization curves, using the method described on pages 574 to 578 of the book "Basic Electrical Engineering" by A. E. Fitzgerald, D. U. Higginbotham and A. Grabel (4th ed., McGraw-Hill Book Co., New York 1975).

EXAMPLE 1

To 100 parts by weight of an epoxy resin prepared by the polycondensation of epichlorohydrine and novolak resin (a liquid resole resin obtained by the polycondensation of phenol, tricresol and formaldehyde in the presence of hydrochloric acid as catalyst), which epoxy resin has the following characteristics:

epoxy-group content: 18–22
impact bending strength: 600 kp/cm$^2$
Brinell hardness; 30 to 35 kp/cm$^2$
specific resisitvity per volume at 20° C.: $4 \times 10^{15}$ ohm.cm
thermal stability according to Martens: 180° C.
water uptake in 24 hours: 0.05%, Parts by weight of MnO.Fe$_2$O$_3$ ferrite of an average grain size of 100$\mu$ are added in a ball mill at room remperature, and the mass is homogenized for 8 hours. Then 15 minutes before the termination of the homogenization period, 8 parts by weight of methyl tetrahydrophthalic acid anhydride as cross-linking agent are added, and stirring is continued for further 15 minutes. The homogeneous mass is transferred from the ball mill onto an aluminum tray, and the tray heat-treated for 6 hours in an 80° C. furnace. The material which solidified during the heat treatment is ground in a mill to a fine powder, and on combining the powder with glass tissue in a press tool, sheets of 1 mm thickness are compressed from the mass at 110° C. at a specific pressure of 180 kp/cm$^2$ for a pressing period of ten minutes. The relative permeability of the sheets amounts to $\mu_r = 60$. Copper foils of 0.05 mm each are then secured to both sides of the sheets, and coils are applied at the surface of the foils by any method usual in the printed circuit technique.

The efficiency of motors equipped with a rotor prepared in this way is by 22% higher than that of a motor of completely identical construction but equipped with a rotor containing no mild magnetic material.

EXAMPLE 2

To 100 parts by weight of a polyester resin prepared by the polycondensation of propylene glycol and phthalic acid anhydride in active styrene as solvent containing 2 parts by weight of sorbitan monostearate, which polyester resin has the following characteristics:

density: 1.12–1.16 g/cm$^3$
viscosity: 500–800 cpoise
gel formation at 40° C. in the presence of 0.2 parts by weight of dimethyl aniline: 60–120 minutes
tensile strength: 400–450 kp/cm$^2$
Brinell hardness: 14–18 kp/cm$^2$
specific resistivity per volume at 20° C.: $1.1 \times 10^{14} – 4.0 \times 10^{15}$ ohm.cm thermal stability according to Martens: 190° C., 20 parts by weight of CuO.Fe$_2$O$_3$ ferrite of an average grain size of 80$\mu$ are added in a ball mill at room temperature, then the mass is homogenized for 4 hours. After the termination of homogenization 2 parts by weight of benzoyl peroxide as initiator are added to the mixture, and homogenization is continued for further ten minutes. The homogeneous mixture is poured from the ball mill onto an aluminum tray, and the tray heat-treated for 5 hours in a 60° C. furnace. The solid material obtained after heat-treatment is ground to a powder in a mill, and on combining the powder with glass tissue in a press tool, sheets of 1 mm thickness are compressed from the mass at 160° C. at a specific pressure of 190 kp/cm$^2$ for a pressing period of 5 minutes.

The relative permeability of polyester sheets produced in this way amounts to $\mu_r = 85$. Copper foils of 0.05 mm each are then secured to both sides of the sheets, and coils are applied on the surface of foils by any method usual in the printed circuit technique.

The efficiency of motors equipped with a rotor prepared in this way is by 23% higher than that of a motor of completely identical construction but equipped with a rotor containing no magnetic material.

EXAMPLE 3

To 100 parts by weight of a press powder of bakelite type prepared by polycondensation from phenol and formaldehyde under modification with 5 parts by weight of natural resin in the presence of ammonium hydroxide as catalyst, which press powder has the following characteristics:

bromine number: 12
gel formation period at 150° C.: 60–150 seconds
dropping point: at least 85° C., 15 Parts by weight of CoO.Fe$_2$O$_3$ ferrite of an average grain size of 110$\mu$ are added, and the mixture of the two components is homogenized in a moist state in a ball mill for 5 hours. Then 10 parts by weight of fibreglass of a cross section of 0.1 mm and cut to a length of 2 mm are added to the homogeneous mixture, and the mass is homogenized for further 2 hours. The homogeneous press powder mixture is dried for 3 hours in a 60° C. furnace, and 1 mm thick sheets are compressed from the material pretreated in this way, in a suitable press tool, at 130° C. under a specific pressure of 175 kp/cm$^2$ for a pressing period of 5 minutes.

The relative permeability of the bakelite sheets obtained in this way amounts to $\mu r = 45$. Copper foils of 0.05 mm thickness are then secured to both sides of the sheets, and coil arrangements suitable for linear movements are applied on the surface of the foils by any method usual in the printed circuit technique.

The moving part suitable for linear movements developed in this way is then built up as a component of a pulling magnet into hammer-type typewriter equipment of quick operation (4 mm/sec$^{-3}$), e.g. into an alpha numerical symbol printing device. In relation to similar equipment containing a moving part arranged on a non-magnetic insulator sheet, an efficiency increase by 18% is attained.

EXAMPLE 4

100 Parts by weight of caprolactam prepared from 93 parts by weight of AG-salt (a compound prepared by the reaction of equimolar amounts of hexamethylene diamine and adipic acid) and 7 parts by weight of ω-amino-caprolactam, and which caprolactam has the following main characteristics:

tensile strength: 570 kp/cm$^2$
specific resistivity per volume: $10^{11}$ ohm.cm
melting point: 237° C.
water content: not more than 0.4%
specific viscosity of a 0.5% solution in tricresol: 0.65 cpoise, are melted in a nitrogen atmosphere, then 20 parts by weight of $CoO.NiO.ZnO.Fe_2O_3$ ferrite of an average grain size of 100 μ are mixed up with the melt for a mixing period of 30 minutes. After the admixture the melt is cooled to room temperature, and sheets of 1 mm thickness are compressed from the material at 200° C. at a specific pressure of 170 kp/cm$^2$. The relative permeability of the sheets amounts to $\mu_r = 40$. Then copper foils of 0.05 mm thickness are secured to both sides of the thus-obtained polyamide sheets, and a coil system of undulating arrangement is applied on the surface of foils by means of any method usual in the printed circuit technique.

The efficiency of the motor equipped with a rotor developed in this way is by 20% higher than that of a motor of completely identical construction but equipped with a rotor containing no magnetic additive.

EXAMPLE 5

100 Parts by weight of powdered polytetrafluoroethylene are loosened by sifting, then 18 parts by weight of powdered $CuO.Fe_2O_3$ ferrite of an average grain size of 60 μ are added under continuous stirring. Sheets of 1 mm thickness are compressed at room temperature from the mixture produced in this way, and the sheets are sintered for 2 hours in a sintering furnace at 380° C. After the completion of the sintering process the sheets are cooled to room temperature at a speed of 3° C./minute, then discs of a size corresponding to the armature to be produced are cut out. Copper sheet parts compressed to a shape corresponding to the loopy coiling to be obtained are secured to both sides of these discs.

The efficiency of the motor equipped with the armature produced in this way is by 22% higher than that of a motor of completely identical construction but equipped with an armature containing no magnetic additive.

EXAMPLE 6

To 94 parts by weight of chemically pure $\alpha-Al_2O_3$ 2 parts by weight of $SiO_2$, 2 parts by weight of MgO and 2 parts by weight of powdered iron prepared from iron pentacarbonyl are added in a ball mill, and the mixture is homogenized for 2 hours. On adding 40 parts by weight of a 40% by weight aqueous solution of polyvinyl alcohol to the ground mass, a plastic mass is prepared, and the flat armature of the motor is produced from this mass by die-casting, then the flat armature taken out of the die-casting tool is dried in a 500° C. furnace. The dried armature having a still slightly porous surface is then allowed to stand 2 hours in a 50% by weight aqueous solution of $CuCl_2$, dried again, and sintered in a 1690° C. furnace in reducing atmosphere. After this sintering process a flat armature with a completely smooth surface and free of pores is obtained which surface is coated by a copper film of about 5 microns thickness. The relative permeability of the flat armature is $\mu_r = 38$. On placing the sheet into an electroplating bath, the copper coat on the surface is increased to a thickness of about 80 microns. On the surface of the flat armature a coil system is applied by any method usual in the printed circuit technique.

An increase of the efficiency of about 12% in comparison to that of a motor equipped with a flat armature embodying a non-magnetic ceramic sheet is obtained. The motor operates trouble-free even at high temperatures (up to 300° C.).

EXAMPLE 7

In a vibration mill 0.5 parts by weight of $ZrO_2$ and 11 parts by weight of $NiO.Fe_2O_3$ are mixed up with 92 parts by weight of chemically pure $\alpha-Al_2O_3$. After homogenization 30 parts by weight of a 40% by weight aqueous solution of polyvinyl alcohol are added to the mixture, and a plastic mass is made. From the mass, sheets of a size of 50 × 50 × 0.8 mm are prepared at a pressure of 150 kp/cm$^2$. These sheets are dried at 600° C. and then sintered at 1720° C. The surface of the sheets produced in this way is ground by a diamond tool until it becomes smooth. Onto the surface of the completely smooth and porefree corundum sheets a copper coat of about 5 micron thickness is transferred by evaporation under vacuum. The thickness of the copper film is then increased to about 80 microns by electroplating. The relative permeability of the copper-plated ceramic sheet prepared in this way amounts to $\mu_r = 42$. On the surface of the flat armature a coil system suitable for linear movement is applied by any method usual in the printed circuit technique.

The moving part suitable for linear movements developed in this way is then built up as a component of a pulling magnet into hammer-type typewriter equipment of quick operation (3 mm/sec$^{-3}$), e.g. into an alpha-numerical symbol printing device. In relation to equipment containing a moving part arranged on a non-magnetic corundum insulator sheet, an efficiency increase of 16% is attained.

What we claim is:

1. A linearly moving or rotated flat armature for motors or pulling magnets, comprising a carrier of plastics or of ceramics and a coil system placed on this carrier, characterized in that said carrier contains 2 to 50% by weight of a mild magnetic substance distributed therein homogeneously, said mild magnetic substance having a permeability of 10,000–100,000 μ and a coercive force of 0.015–1 Oe, said carrier being a flat sheet, and said coil system comprising at least one thin layer of conductive material on at least one side of said carrier.

2. A flat armature as claimed in claim 1, in which the carrier contains 10 to 18% by weight of said mild magnetic substance.

3. A flat armature as claimed in claim 1, in which the mild magnetic substance is a mild magnetic alloy, mild iron or mild ferrite.

4. A flat armature as claimed in claim 1, in which said coil system is disposed on both sides of said carrier.

5. A coil system as claimed in claim 1, in which said conductive material is copper.

* * * * *